Mar. 6, 1923.
J. B. GATS
AUTOMOBILE VISOR
Filed July 8, 1921
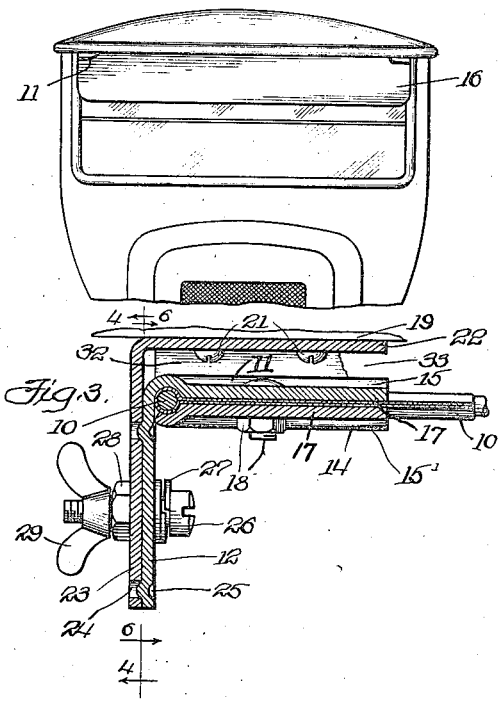
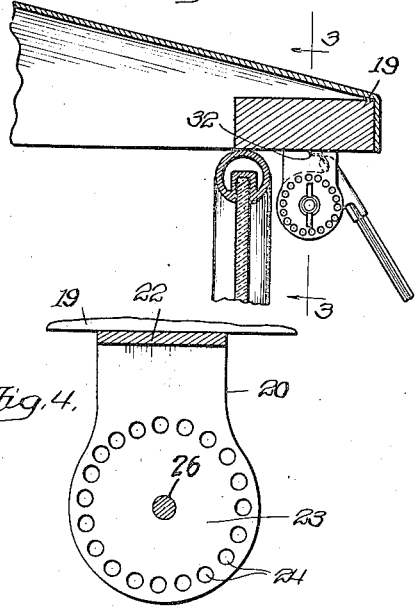
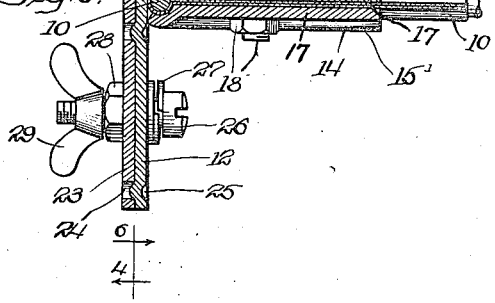
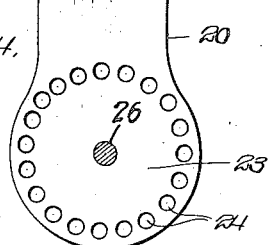
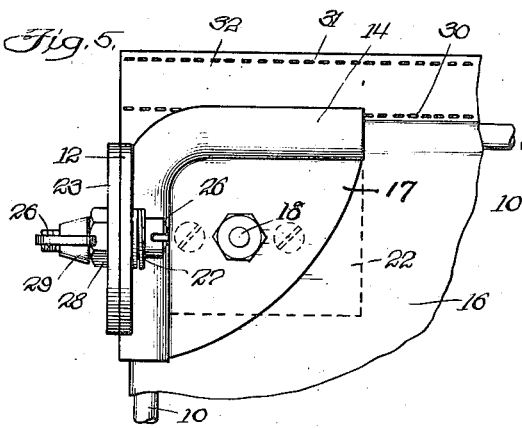
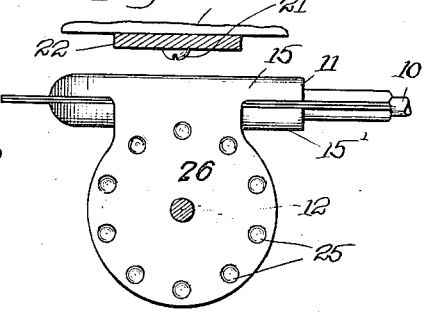
Inventor:
John B. Gats.

Patented Mar. 6, 1923.

1,447,655

UNITED STATES PATENT OFFICE.

JOHN B. GATS, OF CHICAGO, ILLINOIS, ASSIGNOR TO AARON M. SEARLES, OF CHICAGO, ILLINOIS.

AUTOMOBILE VISOR.

Application filed July 8, 1921. Serial No. 483,298.

*To all whom it may concern:*

Be it known that I, JOHN B. GATS, a citizen of the United States, residing at Chicago, in the county of Cook and State of Illinois, have invented certain new and useful Improvements in Automobile Visors, of which the following is a specification.

This invention relates to improvements in automobile visors.

One of the objects of the invention is to provide an improved visor.

Another object is to provide a visor comprising relatively few and inexpensively manufactured and assembled parts.

Another object is to provide an adjustably positioned visor which will more closely fit the cross piece of an automobile top.

Another object is to provide an adjustable visor which is simple, compact, neat, strong and readily installed on an automobile.

Other objects and advantages will hereinafter appear.

An embodiment of the invention is illustrated in the accompanying drawing, wherein,—

Fig. 1 shows the device as applied to an automobile above the windshield.

Fig. 2 is a side elevation of the visor.

Fig. 3 is an enlarged section taken substantially on line 3—3 of Fig. 2.

Fig. 4 is a section taken on line 4—4 of Fig. 3.

Fig. 5 is an enlarged bottom or inverted plan view of one inner corner of the visor.

Fig. 6 is a section taken on line 6—6 of Fig. 3.

In all the views the same reference characters are employed to indicate similar parts.

The present invention is an improvement upon the visor set forth in Patent No. 1,430,499 granted September 26, 1922. The present visor, while possessing the advantages of the structure set forth in the aforesaid patent, is simpler, more completely shields the driver from sunlight and more adequately protects the driver and the windshield from wind, rain, snow, etc. Further the overhang of the visor beyond its supports and pivots is reduced and a closer fit is obtained between the top of the visor and the top of the automobile, also the vibration of the visor is reduced. The present visor may be more readily installed on an automobile because the pivot screw is beyond the outside of the frame.

The visor comprises, in general, a substantially rectangular frame carrying an opaque or partially opaque shield of fabric or other suitable material, cooperating or complementary corner members which encompass the opposite upper or inner corners of the frame and provide a pair of brackets, and supports for attachment to the automobile top and pivotal connection to the brackets.

The frame 10 is rectangular in shape and is made preferably of a wire joined together between the corner plates at one of the corners.

One of the corner members or plates 11, the upper one, is prolonged at right angles to form a bracket 12. The lower corner plate 14 is similar in form to the plate 11 but without the bracket. The plates each have substantially half round beads 15, 15', respectively curved at the corners to fit and enclose the curved corners of the frame 10. Each bracket 12 is formed with a substantially circular head, as most clearly shown in Fig. 6.

Frame 10 carries a suitable shield 16 which may be in the form of an opaque or partially opaque fabric covering stretched over and between the four sides of the frame. Beads 15 and 15' of the two cooperating complementary corner plates 11 and 14 at each end of the frame overlie the fabric covering at the corners. The heads of each corner plate may be joined by an interconnecting web 17 as shown. These webs bridge the corners and overlie the fabric. The cooperating corner members may be clamped together and upon the frame corner and fabric by a bolt and nut connection 18.

Brackets 12 are pivotally connected to supports 20 which are adapted to be secured to a cross piece 19 usually provided adjacent the front edge of an automobile top. Each support has a foot 22 which is inturned toward the center of cross piece 19 and is secured thereto by screws 21. The downward and substantially vertically disposed member of each support 20 is enlarged into a circular bearing and adjusting head 23. When the visor brackets are applied to the supports the brackets lie within the angles of the supports with the head of each bracket 12 against the head 23 of the adjacent support and with the foot of each support overlying the corresponding corner members. The outer faces of heads 23 are provided with a circularly disposed series of perforations 24 and the heads of brackets 12 are provided with a corresponding series of projections 25. These registering perforations and projections assist in locking the visor rigidly in any adjusted position.

Brackets 12 and supports 20 are pivotally interconnected by bolts 26 which pass through their abutting heads. The connection is made yieldingly adjustable by a spring washer 27 and nuts 28 and 29.

The covering 16 is stitched along the inner or top edge at 30 and again at 31 to leave a flap 32. The flap 32 closes the opening 33 that extends between the inner edge of the visor and the supporting member 19. The flap being flexible permits considerable movement of the visor without leaving contact with the member 19.

Having described my invention what I claim is:

1. A visor having a rectangular frame; a fabric covering the frame; a pair of clamping members at each of two corners of the frame, each member having a curved corner bead for fitting a corner of the frame and the members acting together to embrace the fabric adjacent the corner of the frame; and a bracket extending from the bead of one clamping member of each pair.

2. A visor having a frame for carrying a protective shield; a pair of clamping members at each of two corners of the frame, each member having a curved angular corner bead to fit about adjacent sides of the frame at the respective corner thereof; and a bracket extending from the bead of one of the clamping members of each pair and at an angle to the plane of the respective member.

3. A visor comprising a pair of supports, each having a head and a laterally extending foot for attachment to an automobile; a frame for carrying a shield and having two substantially right angled corners; a pair of brackets, each having a head lying parallel to and against the head of a support and with an integral laterally and inwardly extending clamping member for fitting the adjacent right angled corner of the frame; a pair of complementary clamping members, each fitting a right angled corner of the frame opposite the clamping member of the corresponding bracket; means for clamping the members together in pairs so that they embrace the respective corners of the frame; and a pivotal connection between the brackets and supports.

4. A visor having two substantially right angled supports for attachment to an automobile; a frame for carrying a shield and having two substantially right angled corners; two corner members, each formed to embrace two adjacent sides of the frame and extending at an angle to the frame to form a bracket and each corner member and its bracket lying within the angle of the adjacent support; two complementary members to embrace adjacent sides of the frame opposite the corner members; means to clamp the members upon corners of the frame; and pivotal connections between the brackets and the supports.

In testimony whereof I hereunto subscribe my name.

JOHN B. GATS.